United States Patent
Chen et al.

(10) Patent No.: US 8,150,126 B2
(45) Date of Patent: Apr. 3, 2012

(54) METHOD AND SYSTEM FOR SCALE-BASED VESSEL ENHANCEMENT IN X-RAY ANGIOGRAPHY

(75) Inventors: Terrence Chen, Princeton, NJ (US); Yunqiang Chen, Plainsboro, NJ (US)

(73) Assignee: Siemens Aktiengesellschaft, Munich (DE)

( * ) Notice: Subject to any disclaimer, the term of this patent is extended or adjusted under 35 U.S.C. 154(b) by 873 days.

(21) Appl. No.: 12/283,582

(22) Filed: Sep. 12, 2008

(65) Prior Publication Data
US 2009/0087071 A1    Apr. 2, 2009

Related U.S. Application Data

(60) Provisional application No. 60/975,297, filed on Sep. 26, 2007.

(51) Int. Cl.
*G06K 9/00*  (2006.01)
(52) U.S. Cl. ......... 382/130; 382/128
(58) Field of Classification Search ........ 378/62, 378/98.2, 98.7, 98.11, 98.12; 382/128, 130
See application file for complete search history.

(56) References Cited

U.S. PATENT DOCUMENTS

| | | |
|---|---|---|
| 6,265,875 B1 | 7/2001 | Saranathan et al. |
| 6,475,149 B1 | 11/2002 | Sumanaweera |
| 2005/0015006 A1 | 1/2005 | Mitschke et al. |
| 2006/0023840 A1 | 2/2006 | Boese |
| 2006/0034501 A1* | 2/2006 | Abe ............... 382/130 |
| 2007/0016108 A1 | 1/2007 | Camus et al. |

OTHER PUBLICATIONS

Chan, Tony F. et al., "Aspects of Total Variation Regularized L1 Function Approximation", UCLA CAM Report 04-07, 2004.

\* cited by examiner

*Primary Examiner* — Hoon Song (57) ABSTRACT

A method and system for scale-based vessel enhancement in x-ray angiography images is disclosed. An input x-ray image is denoised. A lighting field is estimated in the denoised image. Vessels are extracted from the denoised image by dividing the denoised image by the estimated lighting field. Vessels are enhanced in the input x-ray image by linearly combining the extracted vessels with the input x-ray image, resulting in an enhanced image.

24 Claims, 7 Drawing Sheets

METHOD AND SYSTEM FOR SCALE-BASED VESSEL ENHANCEMENT IN X-RAY ANGIOGRAPHY

This application claims the benefit of U.S. Provisional Application No. 60/975,297, filed Sep. 26, 2007, the disclosure of which is herein incorporated by reference.

BACKGROUND OF THE INVENTION

The present invention relates to visualizing vessels in x-ray angiography, and more particularly to scale-based vessel enhancement in x-ray angiography.

Angiography is a medical imaging technique in which x-ray images are used to visualize internal blood vessels of the body, including the heart and brain. Since blood has the same radiodensity as the surrounding tissues, these blood filled structures cannot be differentiated from the surrounding tissue using conventional radiology. Thus, in angiography, a radiopaque substance is added to a blood vessel, to make the blood vessel visible via x-ray. Traditionally, angiography has been used to diagnose pathology of vessels, for example to find a blockage in a blood vessel. IN recent decades, radiologists, cardiologists, and vascular surgeons have used x-ray angiography to guide minimally invasive surgery of the blood vessels and arteries of the heart. X-ray angiography has also been used for therapy.

Figure 1:
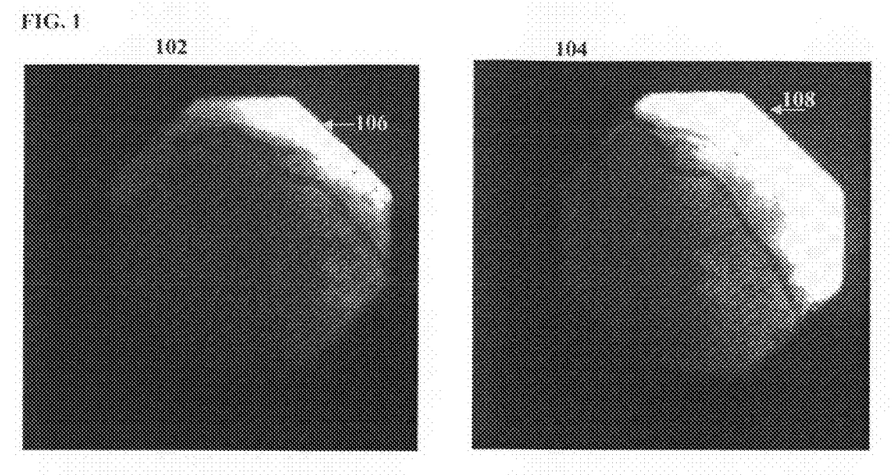
FIG. 1 illustrates exemplary x-ray images obtained using x-ray angiography.
Figure 2:
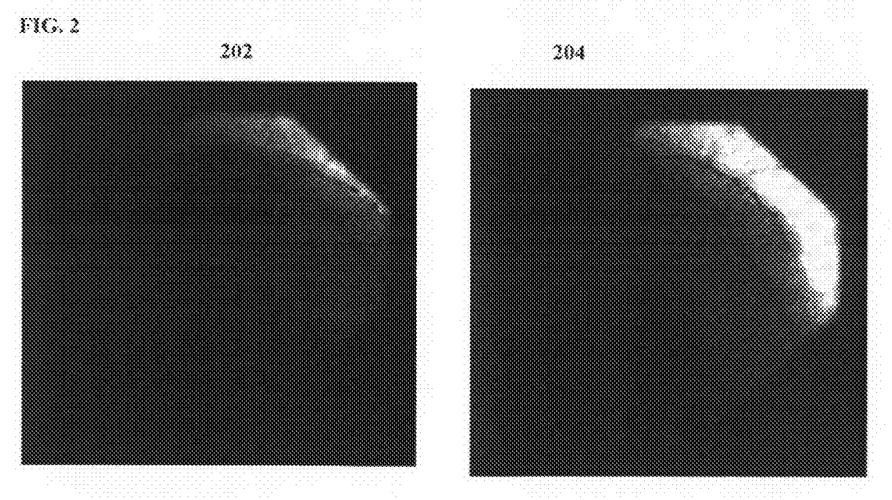
FIG. 2 illustrates conventional contrast adjustment.

A common problem with x-ray angiography is a fading out effect on the boundary between heart and lung regions of the resulting x-ray images. This effect results from an inhomogeneous background signal, and causes vessels near the boundary between the heart and lung regions to be hardly (or not at all) visible in the x-ray image. FIG. 1 illustrates exemplary x-ray images obtained using x-ray angiography. As illustrated in FIG. 1, images 102 and 104 are original x-ray images obtained using x-ray angiography. As shown in images 102 and 104, a fading effect occurs in boundary regions 106 and 108, respectively, making vessels in the boundary regions 104 and 106 hardly visible. It is possible to better visualize the boundary parts of an x-ray image by adjusting the contrast or brightness of the image. FIG. 2 illustrates conventional contrast adjustment. As illustrated in FIG. 2, images 202 and 204 are contrast-adjusted images, obtained by conventional contrast adjustment to the x-ray angiography images 102 and 104, respectively, of FIG. 1. Although, conventional contrast adjustment can be used to better visualize a heart and lung boundary region of an x-ray image, the background of the general heart region in the x-ray is affected by these global adjustments, which results in decreased visualization of vessels in regions of the image not close to the boundary.

BRIEF SUMMARY OF THE INVENTION

The present invention provides a method and system for vessel enhancement in x-ray angiography images. Embodiments of the present invention normalize the image background for better visualization, and also reduce noise and enhance vessels in the image. Embodiments of the present invention utilize the fact that lighting fields in x-ray images have larger scales than vessels in order to extract the lighting fields and remove them from x-ray images. This allows the vessels to be extracted from x-ray images. The x-ray images can be flexibly adjusted to enhance the vessels or weaken the background, resulting in images with stronger vessel signals and more homogenous background.

In one embodiment of the present invention, an input x-ray image is denoised. A lighting field is estimated in the denoised image. The lighting field can be estimated based on scale using scale-dependent and intensity-independent decomposition of the denoised image, such as the TV-$L^1$ model. Vessels are extracted from the denoised image by dividing the denoised image by the estimated lighting field. An enhanced image is generated from the input x-ray image in order to enhance the vessels of the input x-ray image based on the extracted vessel. The enhanced image can be generated by linearly combining the extracted vessels with the input x-ray image. Contrast of the enhanced image can then be automatically adjusted.

These and other advantages of the invention will be apparent to those of ordinary skill in the art by reference to the following detailed description and the accompanying drawings.

DETAILED DESCRIPTION OF EXEMPLARY EMBODIMENTS

The present invention relates to a method for scale-based vessel enhancement in x-ray angiography images. Embodiments of the present invention are described herein to give a visual understanding of vessel enhancement method. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system.

Inhomogeneous background intensity makes it difficult to visualize vessels in x-ray angiography images without manual adjustment. Embodiments of the present invention utilize the fact that lighting fields in x-ray images have larger scales than vessels in order to extract the lighting fields and remove them from x-ray images. This allows the vessels to be extracted from x-ray images. The x-ray images can then be flexibly adjusted to enhance the vessels or weaken the background, resulting in images with stronger vessel signals and more homogenous background.

Figure 3:
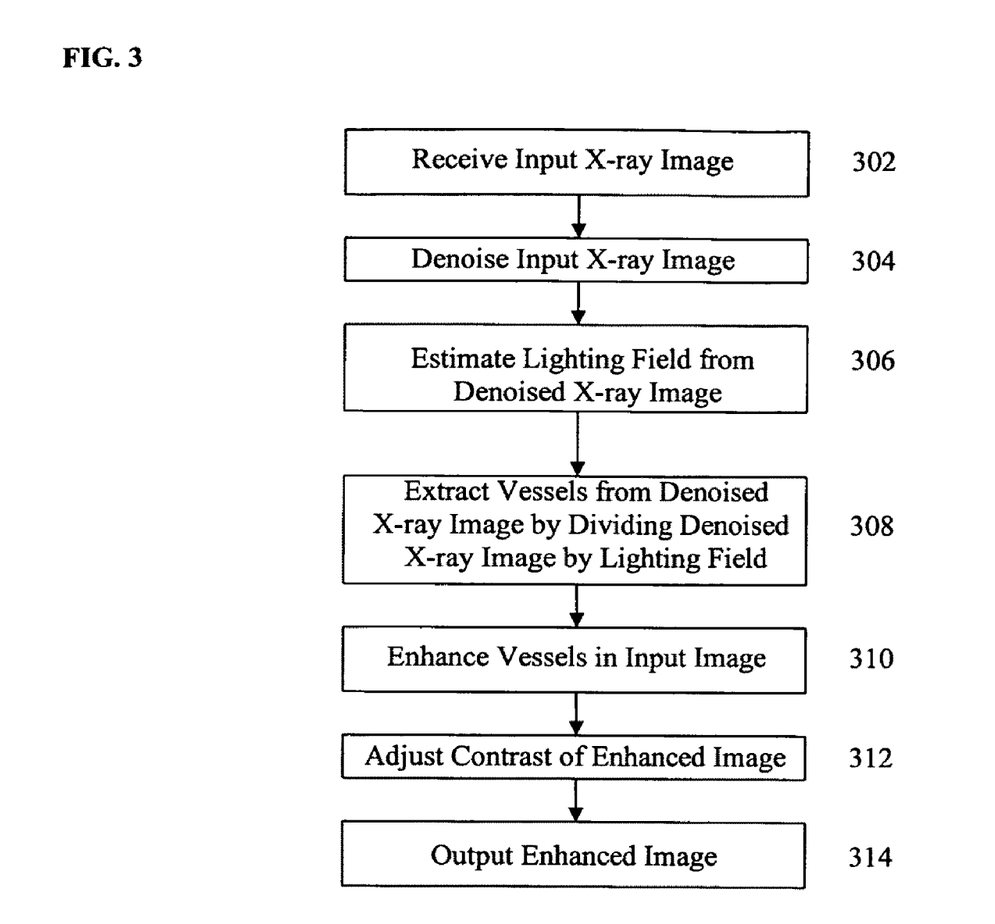
FIG. 3 illustrates a method for vessel enhancement in an x-ray angiography image according to an embodiment of the present invention.

FIG. 3 illustrates a method for vessel enhancement in an x-ray angiography image according to an embodiment of the present invention. As illustrated in FIG. 3, an input x-ray image is received. The input x-ray image can be generated by x-ray angiography. The input x-ray image can be received directly from an x-ray imaging device, or can be loaded, for example from a computer readable medium or a memory or storage of a computer system. FIG. 1 illustrates exemplary x-ray images 102 and 104 obtained using z-ray angiography. As illustrated in FIG. 1, in x-ray images 102 and 104 a fading effect occurs in boundary regions 106 and 108, respectively, making vessels in the boundary regions 104 and 106 hard to see.

Returning to FIG. 3, at step 304 the input x-ray image is denoised. Grainy noise can be generated in the input x-ray image during image acquisition by x-ray angiography. Although this noise may do little to degrade the image quality for visualization, the noise can be amplified by the vessel enhancement method, which enhances the vessels in the image adaptively according to the strength of the background. Accordingly, it is advantageous to remove noise from the input x-ray image before enhancing the vessels.

Figure 4:
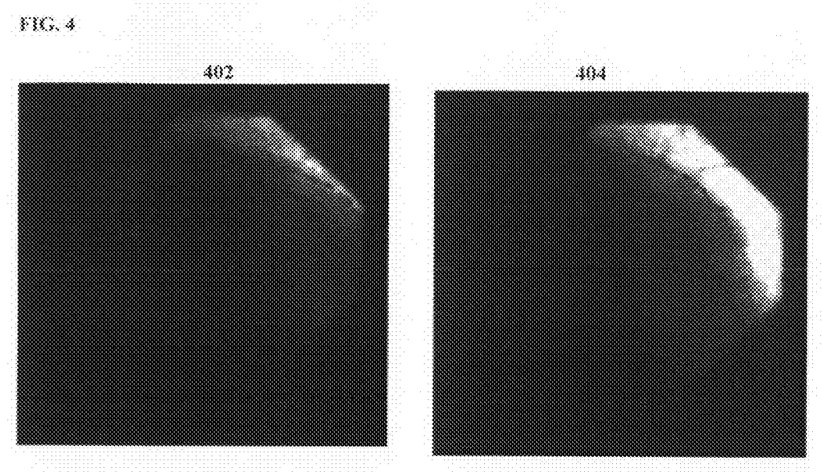
FIG. 4 illustrates exemplary denoised x-ray images.

In order to preserve the vessel structures in the input x-ray image while removing noise, the well-known ROF model can be used for image denoising. Let f be the input image, and the ROF model finds an output image u (denoised image) by solving a regularization problem:

$$u = \min_u \int_\Omega |\nabla u| + \lambda \|f - u\|_{L^2}, \quad (1)$$

where $$\int_\Omega |\nabla u|$$

is the total variation of u over its domain $\Omega$. FIG. 4 illustrates exemplary denoised x-ray images. As illustrated in FIG. 4, images 402 and 404 are denoised images generated from x-ray images 102 and 104, respectively, of FIG. 1. The denoised images 402 and 404 are generated from the x-ray images 102 and 104, respectively, using the ROF model in Equation (1) with $\lambda=0.02$.

Figure 5:
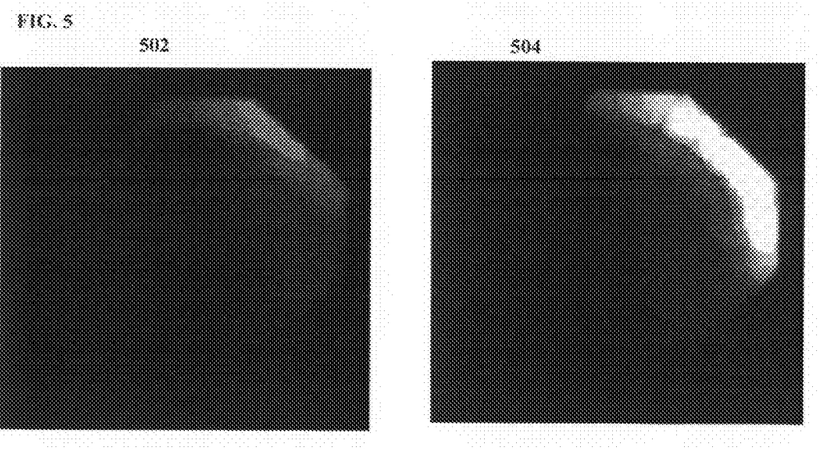
FIG. 5 illustrates exemplary lighting field estimation results.

Returning to FIG. 3, at step 306 a lighting field is estimated from the denoised image based on scale. The lighting field of an image represents the light strength received at each pixel of an image from all lighting sources. It should be independent of the patterns or objects inside the image. In order to normalize the inhomogeneous background of the denoised image, the lighting strength is estimated at every location of the image. Since the scale of the lighting field in the x-ray image is larger than the scale of the vessels, the lighting field can be estimated by decomposing the x-ray image based on scale. The lighting field can be estimated using the TV-$L^1$ model. The TV-$L^1$ model for estimating the lighting field from the denoised image can be formulated as:

$$u = \min_u \int_\Omega |\nabla u| + \lambda \|f - u\|_{L^1}, \quad (2)$$

where f is the denoised input image, and u is a scale-dependent output image. The difference between Equations (1) and (2) is the norm used in the fidelity term. Replacing the $L^2$ norm in Equation (1) with the $L^1$ norm in Equation (2) makes the TV-$L^1$ model a unique scale-dependent, but intensity-independent decomposition method. Since the TV-$L^1$ model is scale-dependent and intensity-independent, larger scale background, such as the lighting field, can be estimated by the TV-$L^1$ model and removed from the denoised image. By selecting a suitable parameter $\lambda$, the lighting field of the denoised image can be estimated using the TV-$L^1$ model. Accordingly, with a suitable value for $\lambda$, the output image u of the TV-$L^1$ model is the estimated lighting field of the denoised image. In order to estimate the lighting field based on the large scale of the lighting field, the value of the parameter $\lambda$ can be small. For example, $\lambda$ can be 0.2-0.8 in an exemplary implementation. It is possible that $\lambda$ is set adaptively, and is inversely proportional to the size of the x-ray image. FIG. 5 illustrates exemplary lighting field estimation results. As illustrated in FIG. 5, images 502 and 504 are estimated lighting fields for denoised images 402 and 404, respectively, of FIG. 4. The estimated lighting fields 502 and 504 are estimated from the denoised images 402 and 404 using the TV-$L^1$ model with $\lambda=0.08$.

Returning to FIG. 3, at step 308, vessels are extracted from the denoised image by dividing the denoised image by the estimated lighting field. Once the denoised image $I_d$ is obtained from the input x-ray image, and lighting field L of $I_d$ is estimated, the vessels v can be extracted by:

$$v = I_d/L. \quad (3)$$

Figure 6:
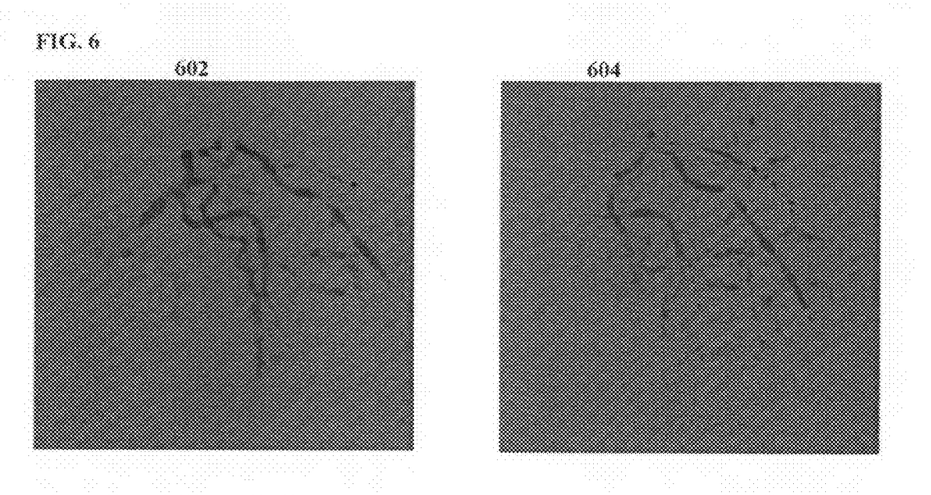
FIG. 6 illustrates exemplary vessel extraction results.

This is because the TV-$L^1$ model used to estimate the lighting field uses scale difference to separate the lighting field from small scale vessels. When the denoised image is divided by the larger scale lighting field estimation, it adaptively promotes only the small scale vessels according to its background. In this way, the small scale vessels are uniformly visualized. FIG. 6 illustrates exemplary vessel extraction results. As illustrated in FIG. 6, images 602 and 604 show vessels extracted from denoised images 402 and 404, respectively, of FIG. 4 by dividing the denoised images 402 and 404 by the estimated light fields 502 and 504, respectively, of FIG. 5. As shown in images 602 and 604, only vessel signals with a homogenous background remain in these images.

Returning to FIG. 3, at step 310, the vessels in the input x-ray image are enhanced. Although the vessels extracted in step 308 provide useful medical information, they may also lose some important information (e.g., the boundary of the heart). The extracted vessels can be used to enhance the vessels in the original input x-ray image in order preserve all of the information available in the input image while strengthening the vessel information for increased visualization of the vessels in the input x-ray image. The vessels are enhanced in the input x-ray image by applying a linear combination between the input x-ray image and the extract vessels. Accordingly, given the input x-ray image f, and the extracted vessels v, the enhanced image I is generated by:

$$I = \alpha v + (1-\alpha)f, \quad (4)$$

where $\alpha$ is a weighting factor that determines the weight of the extracted vessels on the enhanced image. For example, $\alpha$ can be set as 0.67 in an exemplary implementation. Different values of $\alpha$ can be used to generated an enhanced image in which the vessels are more or less prominent. The larger $\alpha$ is, the more the vessels are enhanced and the less the background is observed.

At step 312, the contrast of the enhanced image is adjusted. Although the enhanced image I has the vessels enhanced, its intensity values may not fall into a good range for visualization. Accordingly the contrast of the enhance image can be automatically adjusted for improved visualization. For example, according to possible implementations, the contrast of the enhanced image can be automatically adjusted using redistribution of histogram or histogram equalization.

Figure 7:
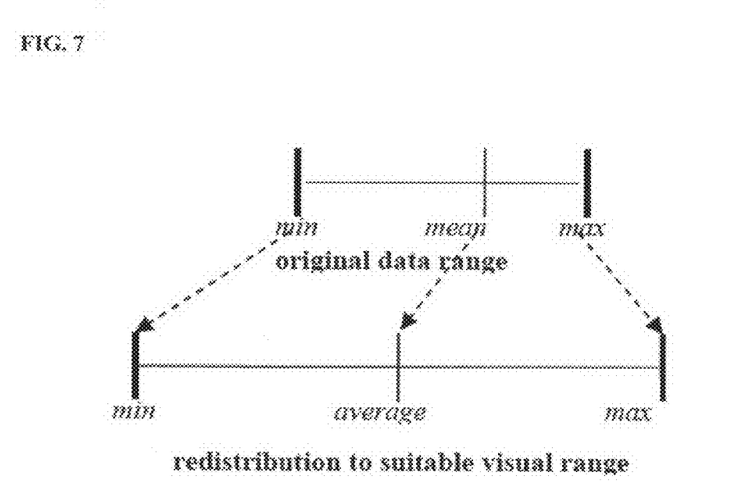
FIG. 7 illustrates image contrast adjustment using redistribution of histogram.

FIG. 7 illustrates image contrast adjustment using redistribution of histogram. As illustrated in FIG. 7, a histogram of intensities of the enhanced image is redistributed from an original data range to a suitable visual range. The original data range of the enhance image histogram is redistributed such that the minimum, maximum, and mean of the original data range are distributed as the minimum, maximum, and average of the suitable visible range. It is to be understood that a suitable visual range of intensities can be set by one skilled in the art.

Another option for automatic contrast adjustment of the enhanced image is histogram equalization. Histogram equalization is a technique by which the dynamic range of the histogram of an image is increased. The output intensity level $O_i$ for an input intensity level i is obtained by:

$$O_i = \left[\sum_{j=0}^{i} n_j\right] \frac{ML}{N} \quad (5)$$

where $$\sum_{j=0}^{i} n_j$$

calculates the number of pixels which have an intensity equal to or smaller than the intensity level i. ML denotes the maximum level of intensity, for example ML=256 for an 8-bit gray scale image. N denotes the total number of pixels in the image.

Returning to FIG. 3, at step 314 the enhanced image is output. The enhanced image can be output by displaying the enhanced image, for example on a display of a computer system. It is also possible to output the enhanced image by printing the enhanced image or storing the enhanced image on a computer readable medium or memory or storage of a computer system.

Figure 8:
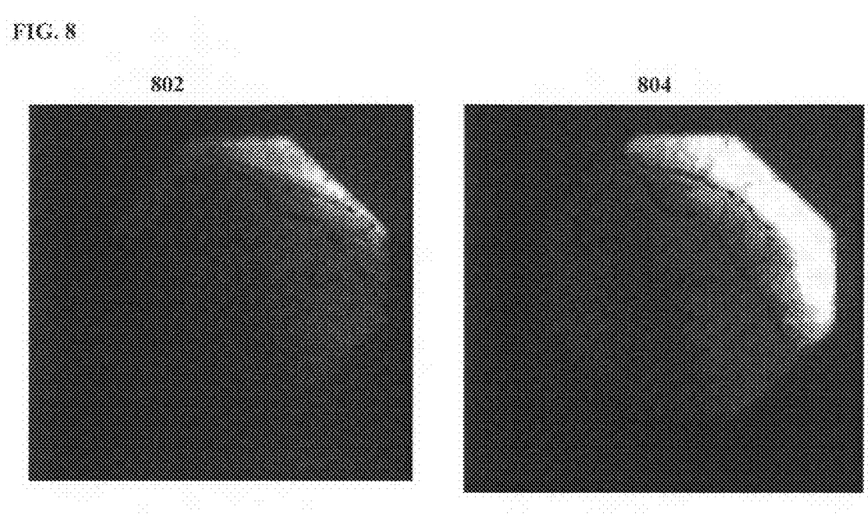
FIG. 8 illustrated exemplary vessel enhancement results using the method of FIG. 3.

FIG. 8 illustrated exemplary vessel enhancement results using the method of FIG. 3. As illustrated in FIG. 8, images 802 and 804 are vessel-enhanced images of the x-ray images 102 and 104, respectively, of FIG. 1. The enhanced images 802 and 804 are generated by linearly combining the x-ray images 102 and 104 with the extracted vessels 602 and 604, respectively, of FIG. 6.

Figure 9:
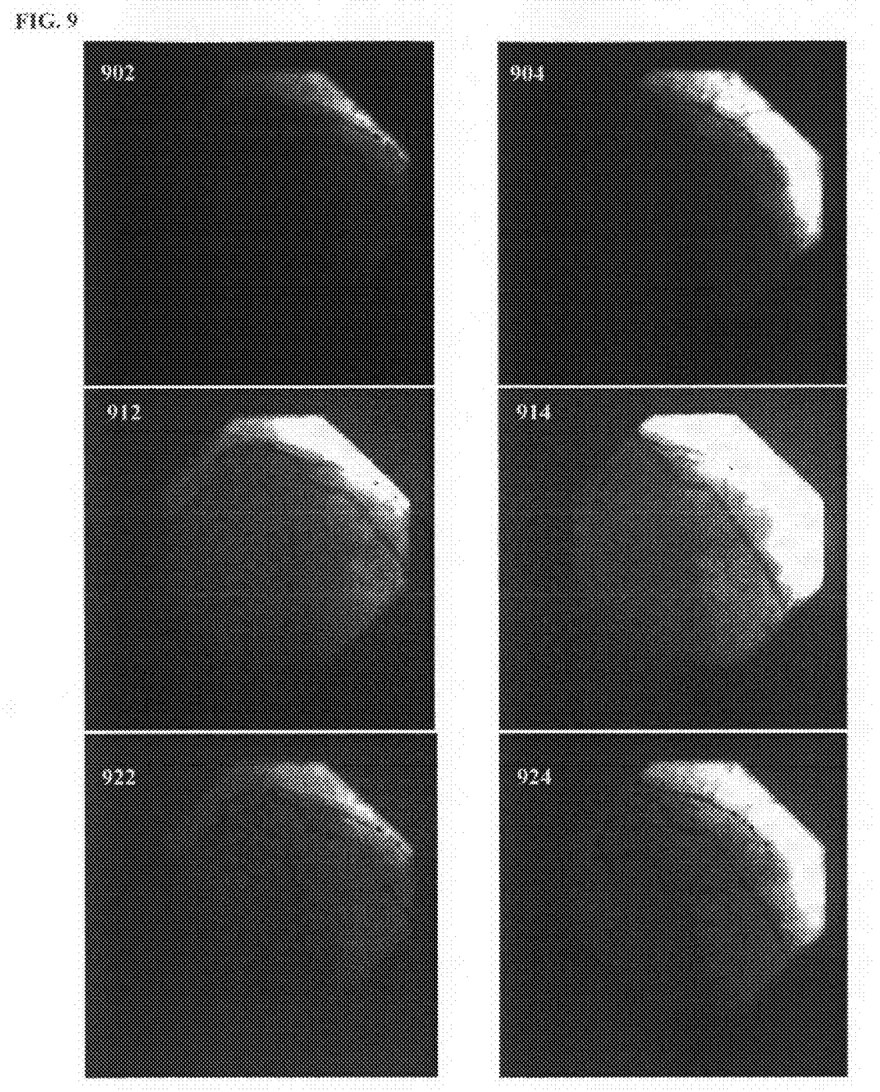
FIG. 9 illustrates x-ray angiography images with different visualization settings compared with enhanced images generated using the method of FIG. 3.

FIG. 9 illustrates x-ray angiography images with different visualization settings compared with enhanced images generated using the method of FIG. 3. As illustrated in FIG. 9, images 902 and 904 are original x-ray angiography images. Images 912 and 914 show the original x-ray angiography images 902 and 904, respectively, with different visualization settings. Images 922 and 924 are vessel enhanced images generated from the original x-ray images 902 and 904, respectively, using the method of FIG. 3. Enhanced image 922 was generated from x-ray image 902 using $\lambda=0.02$ in the TV-$L^1$ model, and enhanced image 924 was generated from x-ray image 904 using $\lambda=0.08$ in the TV-$L^1$ model. A shown in FIG. 9, in the enhanced images 922 and 924, vessels in the entire heart region can be clearly observed at the same time. It can also be observed that noise in the original images 902, 904, 912, and 914 is significantly reduced in the enhanced images 922 and 924. Furthermore, the vessels in the enhanced images 922 and 924 are enhanced so that they are more clearly visualized, as compared with the original x-ray images 902, 904, 912, and 914 at both visualization settings.

Figure 10:
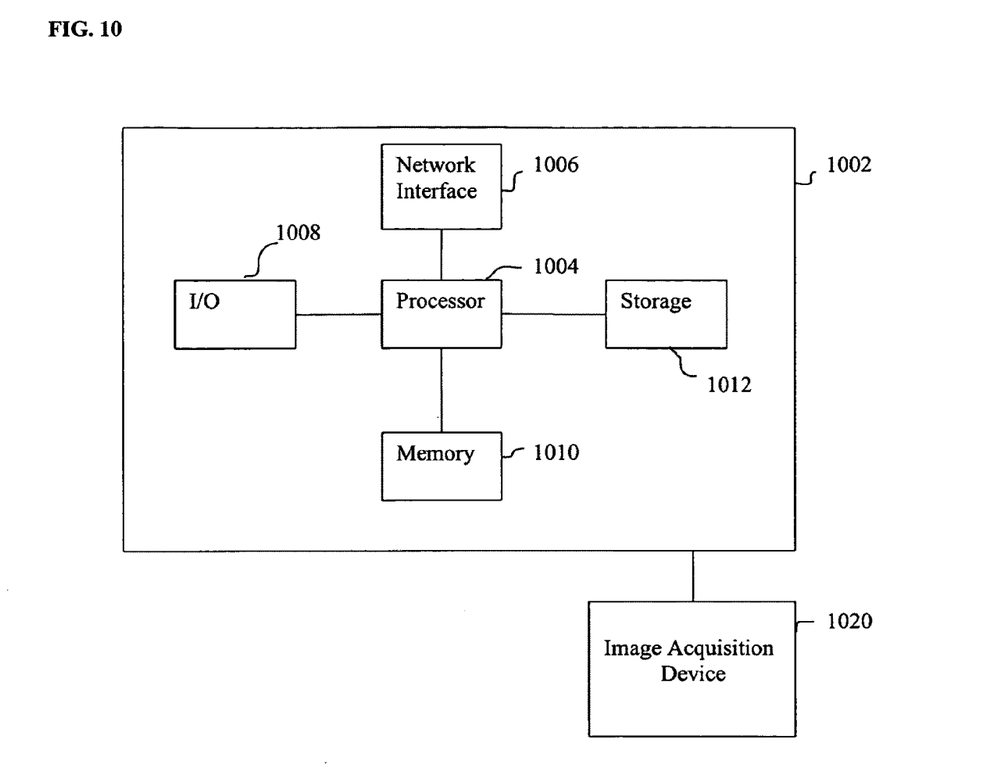
FIG. 10 is a high-level block diagram of a computer capable of implementing the present invention.

The above-described methods for vessel enhancement in x-ray angiography images can be implemented on a computer using well-known computer processors, memory units, storage devices, computer software, and other components. A high-level block diagram of such a computer is illustrated in FIG. 10. Computer 1002 contains a processor 1004 which controls the overall operation of the computer 1002 by executing computer program instructions which define such operation. The computer program instructions may be stored in a storage device 1012, or other computer readable medium (e.g., magnetic disk, CD ROM, etc.), and loaded into memory 1010 when execution of the computer program instructions is desired. Thus, the method steps of FIG. 3 can be defined by the computer program instructions stored in the memory 1010 and/or storage 1012 and controlled by the processor 1004 executing the computer program instructions. For example, the computer program instructions can be implemented as computer executable code programmed by one skilled in the art to perform an algorithm defined by the method steps of FIG. 3. Accordingly, by executing the computer program instructions, the processor 1004 executes an algorithm defined by the method steps of FIG. 3. An image acquisition device 1020, such as an X-ray imaging device, can be connected to the computer 1002 to input digital images to the computer 1002. It is possible to implement the image acquisition device 1020 and the computer 1002 as one device. It is also possible that the image acquisition device 1020 and the computer 1002 communicate wirelessly through a network. The computer 1002 also includes one or more network interfaces 1006 for communicating with other devices via a network. The computer 1002 also includes input/output devices 1008 that enable user interaction with the computer 1002 (e.g., display, keyboard, mouse, speakers, buttons, etc.) One skilled in the art will recognize that an implementation of an actual computer could contain other components as well, and that FIG. 10 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. A method for vessel enhancement in an input x-ray image, comprising:
   denoising the input x-ray image;
   estimating a lighting field in the denoised image;
   extracting vessels from the denoised image based on the estimated light field; and generating an enhanced image by enhancing vessels in the input x-ray image based on the extracted vessels.

2. The method of claim 1, wherein said step of denoising the input x-ray image comprises:
denoising the input x-ray image using an ROF model.

3. The method of claim 1, wherein said step of estimating a lighting field in the denoised image comprises:
decomposing the denoised image based on scale to estimate a large scale lighting field.

4. The method of claim 1, wherein said step of estimating a lighting field in the denoised image comprises:
estimating the lighting field using scale-dependent and intensity- independent decomposition of the denoised image.

5. The method of claim 1, wherein said step of estimating a lighting field in the denoised image comprises:
estimating the lighting field in the denoised image using a TV-$L^1$ model.

6. The method of claim 5, wherein said step of estimating the lighting field in the denoised image using a TV-$L^1$ model comprises generating an estimated light field u from the denoised image f as:

$$u = \min_u \int_\Omega |\nabla u| + \lambda \|f - u\|_{L^1},$$

where $$\int_\Omega |\nabla u|$$

is the total variation or u over its domain $\Omega$, and $\lambda$ is a parameter set to a value corresponding to a scale of the lighting field.

7. The method of claim 1, wherein said step of extracting vessels from the denoised image based on the estimated light field comprises:
dividing the denoised image by the estimated lighting field.

8. The method of claim 1, wherein said step of generating an enhanced image by enhancing vessels in the input x-ray image based on the extracted vessels comprises:
linearly combining the extracted vessels and the input x-ray image to generate the enhanced image.

9. The method of claim 1, further comprising:
automatically adjusting a contrast of the enhanced image.

10. The method of claim 9, wherein said step of automatically adjusting a contrast of the enhanced image comprises:
adjusting a contrast of the enhanced image using one of histogram redistribution and histogram equalization.

11. An apparatus for vessel enhancement in an input x-ray image, comprising:
means for denoising the input x-ray image;
means for estimating a lighting field in the denoised image;
means for extracting vessels from the denoised image based on the estimated light field; and
means for generating an enhanced image by enhancing vessels in the input x-ray image based on the extracted vessels.

12. The apparatus of claim 11, wherein said means for denoising the input x-ray image comprises:
means for denoising the input x-ray image using an ROF model.

13. The apparatus of claim 11, wherein said means for estimating a lighting field in the denoised image comprises:
means for estimating the lighting field using scale-dependent and intensity-independent decomposition of the denoised image.

14. The apparatus of claim 11, wherein said means for estimating a lighting field in the denoised image comprises:
means for estimating the lighting field in the denoised image using a TV-$L^1$ model.

15. The apparatus of claim 11, wherein said step of extracting vessels from the denoised image based on the estimated light field comprises:
dividing the denoised image by the estimated lighting field.

16. The apparatus of claim 11, wherein said means for generating an enhanced image by enhancing vessels in the input x-ray image based on the extracted vessels comprises:
means for linearly combining the extracted vessels and the input x-ray image to generate the enhanced image.

17. The apparatus of claim 11, further comprising:
means for automatically adjusting a contrast of the enhanced image.

18. A non-transitory computer readable medium encoded with computer executable instructions for vessel enhancement in an input x-ray image, the computer executable instructions defining steps comprising:
denoising the input x-ray image;
estimating a lighting field in the denoised image;
extracting vessels from the denoised image based on the estimated light field; and
generating an enhanced image by enhancing vessels in the input x-ray image based on the extracted vessels.

19. The non-transitory computer readable medium of claim 18, wherein the computer executable instructions defining the step of denoising the input x-ray image comprise computer executable instructions defining the step of:
denoising the input x-ray image using an ROF model.

20. The non-transitory computer readable medium of claim 18, wherein the computer executable instructions defining the step of estimating a lighting field in the denoised image comprise computer executable instructions defining the step of:
estimating the lighting field using scale-dependent and intensity- independent decomposition of the denoised image.

21. The non-transitory computer readable medium of claim 18, wherein the computer executable instructions defining the step of estimating a lighting field in the denoised image comprise computer executable instructions defining the step of:
estimating the lighting field in the denoised image using a TV-$L^1$ model.

22. The non-transitory computer readable medium of claim 18, wherein the computer executable instructions defining the step of extracting vessels from the denoised image based on the estimated light field comprise computer executable instructions defining the step of:
dividing the denoised image by the estimated lighting field.

23. The non-transitory computer readable medium of claim 18, wherein the computer executable instructions defining the step of generating an enhanced image by enhancing vessels in the input x-ray image based on the extracted vessels comprise computer executable instructions defining the step of:
linearly combining the extracted vessels and the input x-ray image to generate the enhanced image.

24. The non-transitory computer readable medium of claim 18, further comprising computer executable instructions defining the step of:
automatically adjusting a contrast of the enhanced image.

* * * * *